Patented Sept. 1, 1953

2,650,883

UNITED STATES PATENT OFFICE 2,650,883

COLOR-STABLE RED PEPPER COMPOSITION AND PROCESS OF PRODUCING THE SAME

Lester Oscar Van Blaricom and John Allen Martin, Clemson, S. C., assignors to The Clemson Agricultural College of South Carolina, Clemson, S. C., a corporation of South Carolina No Drawing. Application April 13, 1951, Serial No. 220,974

7 Claims. (Cl. 99—140)

This invention relates to color-stable red pepper composition and process of producing the same; and it comprises a process of preparing color-stable red pepper condiments wherein finely-ground red peppers are intimately and thoroughly mixed with from about 2 to 10 per cent by weight of pulverulent sesame seed or, the mixing being usually accomplished by grinding the dried peppers and sesame seed in admixture. The invention also includes the color-stable compositions produced by the described process, these compositions comprising an intimate mixture of ground red peppers and sesame seed containing from about 2 to 10 per cent by weight of the seed; all as more fully hereinafter set forth and as claimed.

Red pepper condiments tend to deteriorate rather rapidly in storage due to loss of their red color. This action is highly erratic and while some strains of peppers retain their color for periods of as long as 5 years, others turn to various unattractive shades of brown within periods of only a few weeks. Attempts have been made to breed strains which exhibit good color retention but no great success has been achieved as yet by this method. This is at least partly due to the erratic results obtained and to the fact that no satisfactory accelerated ageing tests have been developed and hence that such tests require long periods of time. Attempts have been made to prevent the loss of red color by adding various materials, such as alkalis and buffering agents, as well as by the use of materials which are mere extenders or adulterants. But the results obtained to date by these methods leaves much to be desired.

In the course of an investigation with various additives, we discovered, more or less by accident, that red pepper condiments can be made color stable by the admixture therewith of a small proportion of ground sesame seed (*Sesamum indicum*). The sesame seed can be added to the red pepper either before or after grinding but if added after the grinding step it must be finely ground and intimately mixed with the pepper so that all particles of the pepper are contacted with the sesame seed.

Sesame seed have a high oil content usually amounting to about 50% by weight and it might have been expected that this additional oil would cause difficulties in the grinding step. Some investigators have even suggested that the oils and oleo-resins in the red pepper should be extracted before the grinding step and then added to the ground pepper later in order to avoid grinding difficulties and loss of color during grinding. But we have discovered that the oil present in the sesame seed introduces no mechanical difficulties in the grinding step. In fact grinding is improved to some extent by the presence of the sesame seed. Agglutination is not objectionable and we have been unable to detect any loss of color during the grinding. The oil present in the sesame seed appears to prevent oxidation of the oil present in the pepper both during and after the grinding step. At least no stickiness develops during grinding as it sometimes does in the absence of sesame seed.

Our tests have shown that, in the absence of sesame seed, the greater the quantity of natural oil present in red pepper condiments, the less stable the color. It therefore seems surprising that greater color stability can be obtained in the presence of the extraneous oil present in the sesame seed. Sesame seed seem to be unique in causing this effect. In tests extending over several years we have discovered a few substances in addition to sesame seed which tend to stabilize the color of red pepper compositions. We have been unable to correlate these data so as to be able to predict whether or not a given chemical will be effective. In other words the stabilizing of color in red pepper compositions appears to be empirical. Incidentally, none of these other materials found to be effective in stabilizing the color of red peppers is as practical and unobjectionable to use in condiments from the standpoints of effectiveness, cost and health or food value.

We have discovered that our process is applicable not only to cayenne pepper (*Capsicum annuum*) but also to paprika, which is also derived from the genus Capsicum and to Jamaica pepper or pimiento. This may be due to the fact that these red peppers all contain capsanthin ($C_{40}H_{58}O_3$) which is at least a constituent of the red pigments characteristic of these products. The term "red peppers" as used herein is intended to include these products.

In a series of comparative tests 300 gram samples of dried cayenne pepper were ground with different percentages of sesame seed. The ground mixtures were then sealed in small glass jars and placed in a room where they were exposed to diffused outside light for observation. At the end of 12 months the color retention of the various samples was measured with the following results:

|  | Color Retention End of Year, Percent |
|---|---|
| Control | 30 |
| 2% sesame seed | 40 |
| 4% sesame seed | 60 |
| 10% sesame seed | 80 to 90 |

It is seen from the above table that the composition containing 10% sesame seed had a color retention which was approximately 3 times that of the control which was free from sesame seed. When 20% sesame seed is employed the color retention is somewhat better than that obtained with the use of 10% but the increase is smaller and scarcely justifies the additional expense and dilution of the product.

Samples of dried Perfection pimiento and of paprika, when ground with sesame seed, are found to retain their color better than similar samples ground in the absence of sesame seed. The increased color retention obtained with these red peppers is approximately the same as that shown by the above table.

Our tests also show that it is possible to obtain increased color retention by mixing pre-ground red pepper with pre-ground sesame seed provided that the mixing is conducted shortly after the pepper and the sesame seed have been ground and provided that the mixing is sufficiently thorough. This mixing can be conducted in a pepper grinding mill, for example. We usually prefer however to conduct the mixing and grinding steps simultaneously.

While we have described what we consider to be the most advantageous embodiments of this invention it is evident, of course, that various modifications of our process and of our compositions can be made without departing from the purview of this invention. Thus it is possible to add other spices or seasoning materials to our preparations with the production of color-stable seasoning compositions for various special foodstuffs. One advantage of our invention is that the material added to produce stabilization of the color of the red pepper is not a mere adulterant or extender. Sesame seed has a recognized food value and is extensively used in cooking. Our preparations are of enhanced value due to its presence. During the grinding and/or mixing steps of our invention it is advisable to prevent overheating. It is possible but not essential to provide cooling during the grinding step. Further modifications of this invention which fall within the scope of the following claims will be immediately evident to those skilled in this art.

What we claim is:

1. As a new product, a red pepper condiment comprising an intimate mixture of finely ground red pepper and a small amount of ground sesame seed sufficient to produce enhanced color stability and ranging from about 2 to 10 per cent by weight.

2. The composition of claim 1 wherein the red pepper is cayenne pepper.

3. The composition of claim 1 wherein the red pepper is paprika.

4. The composition of claim 1 wherein the red pepper is pimiento.

5. In the preparation of color-stable red pepper compositions, the process which comprises thoroughly and uniformly mixing a pulverulent red pepper with pulverulent sesame seed, the sesame seed amounting to from about 2 to 10 per cent by weight of the mixture.

6. The process of claim 5 wherein the mixing is accomplished by grinding the red pepper in admixture with the sesame seed.

7. The process of claim 5 wherein freshly ground red pepper is mixed with freshly ground sesame seed.

LESTER OSCAR VAN BLARICOM.
JOHN ALLEN MARTIN.

References Cited in the file of this patent

UNITED STATES PATENTS

| Number | Name | Date |
|---|---|---|
| 1,816,338 | Musher | July 28, 1931 |
| 1,829,431 | Allen | Oct. 27, 1931 |
| 1,841,842 | Musher | Jan. 19, 1932 |